United States Patent [19]

Haycock et al.

[11] Patent Number: 4,782,392
[45] Date of Patent: Nov. 1, 1988

[54] APPARATUS AND METHOD FOR GENERATING A ROTATING CLOCK VIDEO WIPE

[75] Inventors: David A. Haycock, Lakewood; Jay L. Flora, Boulder, both of Colo.

[73] Assignee: Ampex Corporation, Redwood City, Calif.

[21] Appl. No.: 934,576

[22] PCT Filed: Mar. 14, 1986

[86] PCT No.: PCT/US86/00512
§ 371 Date: Nov. 12, 1986
§ 102(e) Date: Nov. 12, 1986

[87] PCT Pub. No.: WO86/05646
PCT Pub. Date Sep. 25, 1986

Related U.S. Application Data

[63] Continuation-in-part of Ser. No. 712,282, Mar. 15, 1985.

[51] Int. Cl.⁴ .................................................. H04N 5/262
[52] U.S. Cl. ..................................... 358/183; 358/22; 358/182
[58] Field of Search ............... 358/181, 183, 22, 182, 358/185; 340/727

[56] References Cited

U.S. PATENT DOCUMENTS

| | | | |
|---|---|---|---|
| Re. 29,600 | 3/1978 | Tkacenko | 358/183 |
| 3,371,160 | 2/1968 | Hurford | 358/182 |
| 3,758,712 | 9/1973 | Hudson | 358/183 |
| 3,821,468 | 6/1974 | Busch | 358/183 |
| 3,944,731 | 3/1976 | Busch | 358/183 |
| 3,962,536 | 6/1976 | Busch | 358/183 |
| 4,121,253 | 10/1978 | McCoy | 358/182 |

Primary Examiner—James J. Groody
Assistant Examiner—John K. Peng
Attorney, Agent, or Firm—Bradley A. Perkins; George B. Almeida; Richard P. Lange

[57] ABSTRACT

An apparatus and method for generating a rotating clock video wipe from two voltage ramps. The voltage ramps are rotated according to rotation data supplied by a controller. The rotated ramps are combined and fed to an output signal generator and then a video mixer.

41 Claims, 2 Drawing Sheets

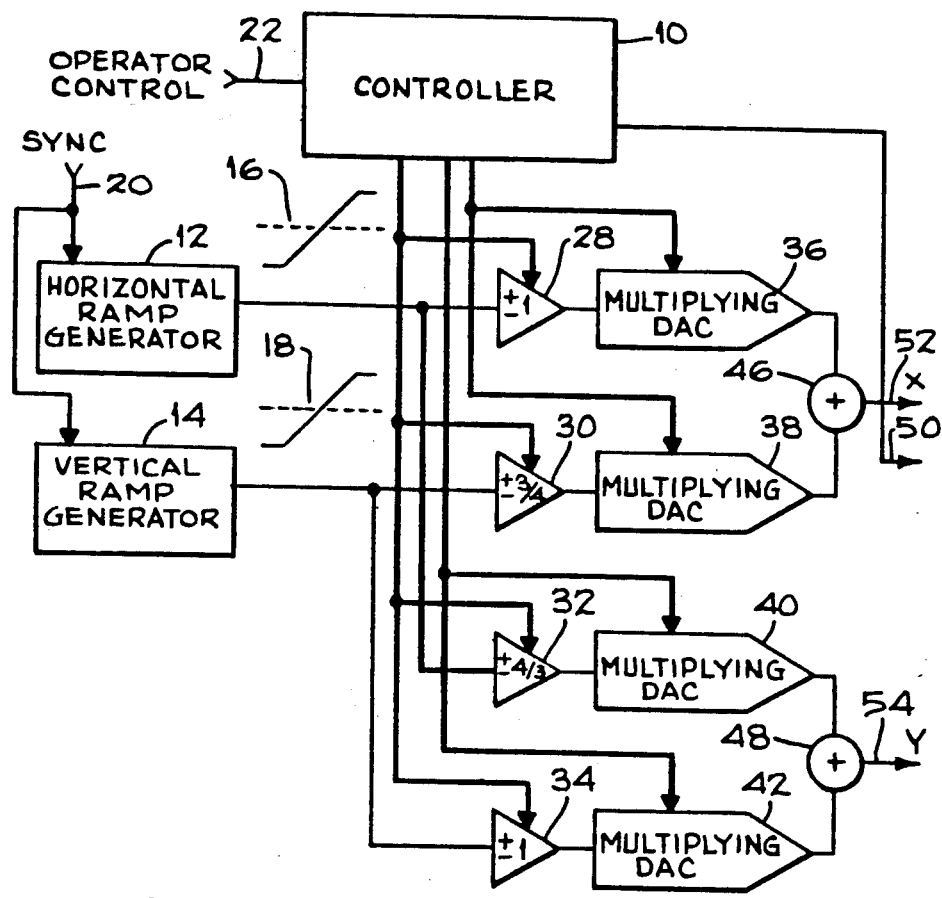
FIG_1
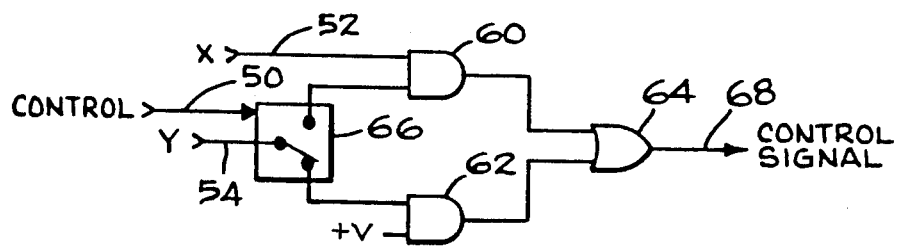
FIG_2

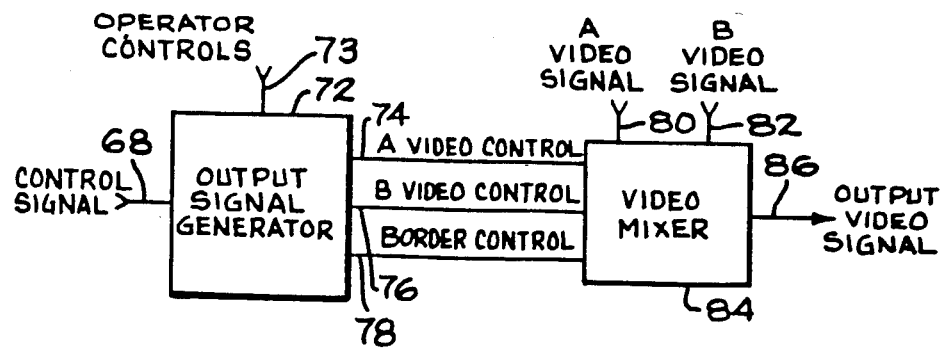
FIG_3
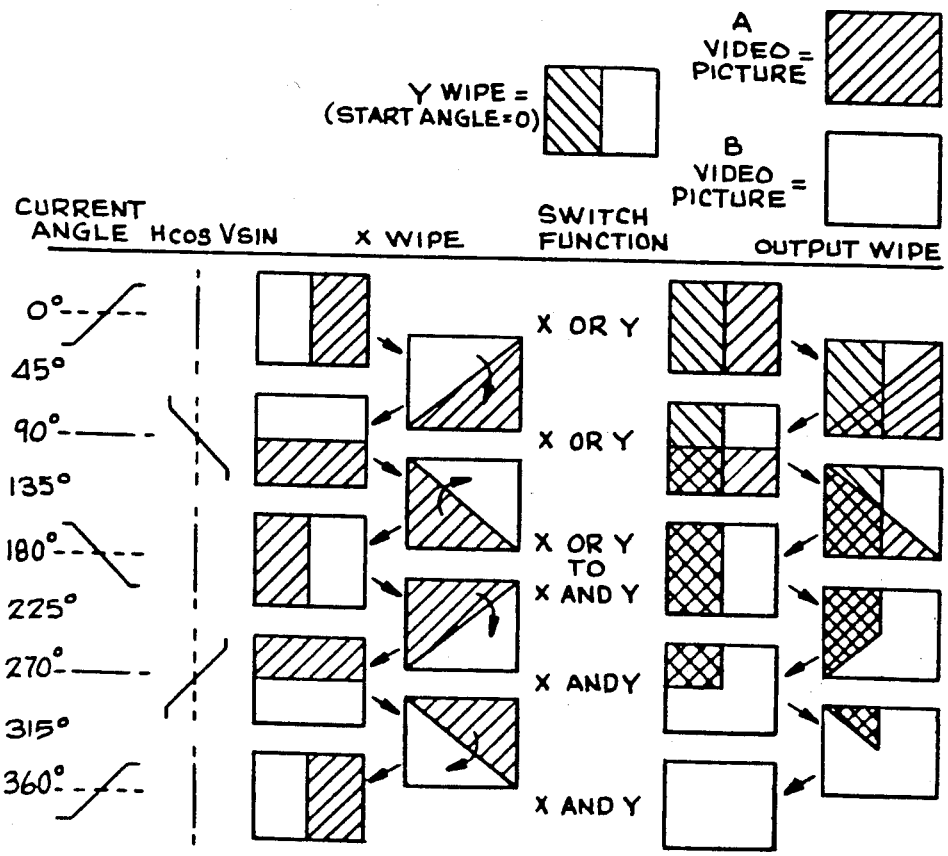
FIG_4

APPARATUS AND METHOD FOR GENERATING A ROTATING CLOCK VIDEO WIPE

This is a continuation-in-part of copending application Ser. No. 712,281 filed on Mar. 15, 1985 now abandoned.

This invention relates generally to the selective formation of an output video signal from at least two input video signals. This invention further relates to switching between these two video signals using a switching technique called a wipe, and more particularly to a specialized wipe called a rotating clock wipe.

BACKGROUND OF THE INVENTION

A finished video presentation is rarely one continuous scene shot from one camera. More commonly, video presentations are a series of short scenes assembled together through an edit process to form the final presentation. Unlike motion picture film which is edited by physically cutting and splicing film segments together, video material is edited by electronically cutting and splicing together segments of video signals.

A video switcher is an electronic device used by the video industry to execute a form of editing wherein video material from a variety of sources are assembled into a finished video presentation. Video material is provided to the video switcher in the form of input video signals from a variety of video sources, such as video tape recorders, optical disk plays, and video cameras. The video switcher typically selects for presentation as an output video signal one or more of the input video signals from the available video sources. This selection is accomplished by switching from one input video signal to another signal, with the time of occurrence of the switch operator. This output video signal is utilized in a variety of ways such as recording by a video tape recorder, displaying on a video monitor, or broadcasting to viewers.

This switch between input video sources can take many forms and often involves several different switching techniques. The most straight forward of the switching techniques is the simple switch between different video signal sources. In such switchers, the output of the switcher is instantaneously switched between the input video signals and only one of the input video signals is present at any one instant at the output of the switcher. To a viewer of the output signal displayed on a monitor or television receiver, the display changes instantaneously from one input video signal to the other different input video signal.

Another technique of effecting a switch between video sources is called a dissolve. A dissolve is a gradual transition between different video signals, with the different video signals appearing simultaneously in the output provided for display during part of the transition interval. The gradual transition is accomplished through adjustable video signal gain controllers, commonly variable attenuators, and a signal combiner, which additively combine and present to an output the gain adjusted video signals provided by the gain controllers. Usually, a dissolve begins with the output video signal being entirely composed of a first input video signal. At a rate determined by the operator, the gain on the first input video signal is reduced to zero, while the gain on a second input video signal is raised from zero to the level originally set for the first signal. To a viewer of the output signal displayed on a monitor, the picture based on the first input signal appears to dim, while the picture based on the second input video source appears very dim at first and then appears to brighten until only the picture based on the second input video source is visible. At the midpoint of the switch, both signals are at an equal gain of one half and the pictures resulting from the displays of the signals are both visible simultaneously on the monitor, each at one-half its normal brightness.

Yet another technique of effecting a switch between video sources is called a wipe. A wipe is created by generating a control signal which is used by a video mixer to switch between input video signals on a line by line basis, such that a line of output video may be composed of parts of both input video signals. This control signal is usually based on the output of ramp generators which are processed by a ramp combiner, which manipulates the ramps and then combines them so as to form a variety of control signals. During a wipe, both input video signals are present in the output video signal. Unlike a dissolve, where both complete input signals, at reduced gains, are additively combined to form the output video signal, in a wipe both signals are used at full gain, but only part of each signal corresponding to spatial segments of a display are present in the output video signal. Generally, the input video signals do not coexist in the same display spatial segment corresponding to the part of the output video signal. This concept is better understood from the standpoint of viewing the display of the output signal on a monitor. The wipe often begins with a first input video signal, when displayed on a monitor, spatially occupying the entire display area of the monitor. As the wipe progresses, the second input video signal displaces the first input video signal, spatially, in part of the display area of the monitor. The area displaying the second input video signal grows according to a selected pattern as the area displaying the first input video signal reduces according to a corresponding pattern, with the patterns determined according to operator inputs. The wipe is completed when the display area on the monitor is entirely occupied by a display of the second input video signal.

A control signal is used to prevent coupling to the output, input video signals areas that are not to be displayed on the monitor. This control signal is simply turned on or off. When on, the input signal is coupled to the output, and when off, the input signal is prevented from being coupled to the output. Because one of the input video signals is presented at the output video signal of the switcher, the control signal for the first input video signal is the reverse of the control signal for the second input video signal.

An example of a simple wipe is the vertical line wipe. When viewed on a monitor, a transition boundary in the form of a vertical line between display areas on the monitor, defines the separation between the displays of the the first and second input video signals. As the vertical line wipe is executed, this transition boundary moves horizontally across the display area wiping from a picture based on the first input video signal to a picture based on the second video input signal. It is the form that this transition boundary takes, that determines what type of wipe is executed. For example, circle wipes have transition boundaries that form the shape of a box and circle, respectively. The greater the variety of wipes a switcher can execute, greater its value.

An unusual, but highly desirable type of wipe is called the rotating clock wipe. To the viewer, the transition boundary extends from a point generally in the central region of the display area of the monitor outward to one of the edges of the display area of the monitor. The end of the transition boundary located in the central region of the display area of the monitor remains fixed while the end located at the edge of the display area sweeps around the outer edge of the monitor display area, like a hand of a clock. The transition boundary proceeds from a starting position, and the display area changes from a first input video signal to a second video signal as the transition boundary rotates about the display area of the monitor back to the starting position. The start position, direction of rotation of the transition boundary, and the rate of rotation are all entered by the operator.

It is common to discuss a rotating clock wipe in terms of a start angle and a current rotation angle. The line of reference most commonly used, from which these angles are measured, is a vertical line extending generally from the central region of the monitor display area to the outer edge of the monitor display. A clock wipe that had a transition boundary which started with its outside end pointed straight up on the monitor display area would have a start angle of 0°. If the outside end pointed horizontally to the right on the monitor screen, the start angle would be 90°, and so on. The current rotation angle is measured from the start angle and indicates the current location of the transition boundary. At the beginning of the wipe, the current rotation angle is 0°, and at the end of the wipe, the current rotation angle is 360°.

Generating a rotating clock wipe requires complex, specialized circuitry. The current methods use a segmented approach to produce the wipe, that is the wipe is generated in small pieces instead of one continuous wipe. The apparatus used to produce this wipe produces a transition boundary that can only be rotated from a start angle of 0° to 90°. A complete 360° wipe is generated in 90° segments. Additional hardware is utilized to translate the 0° to 90° segment into the three other segments of the circle. A complete wipe is generated by rotating the transition boundary from a start angle of 0° to 90°. The apparatus is then reset back to 0° and the translation hardware translates the transition boundary to 90° and the 0° to 90° is re-executed from 90° to 180°. The result of this segmented approach is jerky motion at various points throughout the wipe.

As the apparatus only allows the transition boundary to be started at the beginning of a segment, clock wipes may only be started at the beginning of each segment, thus limiting the operators freedom as to where to start the wipe.

As a result of these problems, there is a need for an apparatus or method that can produce a non-segmented continuous rotating clock wipe. Such an apparatus or method desirably also should perform a rotating clock wipe starting at any position.

SUMMARY OF THE INVENTION

The present invention uses a non-segmented approach to produce a smooth, continuous rotating clock wipe. The present invention further allows the wipe to be started at any angle from a reference line that extends vertically from a central point in the display area of a monitor to the outer edge of the monitor display area.

To produce such a rotating clock wipe, video control signals are produced which specify which of the input video signals will appear in the output video signal. These control signals are used by a video mixer to actually combine the input video signals into an output video signal.

An operator provides a controller with a desired start angle and a current rotation angle of the transition boundary. The current rotation angle varies throughout the wipe and effectively communicates the direction and rate of the transition boundary. From this information, the controller calculates ramp control data and a logic signal.

A ramp generator is used to produce two voltage ramps. A horizontal control ramp signal is produced at a horizontal video rate. Similarly, a vertical control ramp signal is produced at a vertical video rate. The voltage ramps are provided to a ramp rotation circuit which produces a start angle waveform control signal and a rotation waveform control signal. The ramp rotation circuit allows the clock wipe to be started at any angle, while not increasing circuit complexity.

A ramp combiner combines the start angle waveform control signal and the rotation waveform control signal. The two signals are combined by analog ORing when the difference between the start angle and the current rotation angle is less than 180°. When the difference is greater than 180°, the two signals are analog ANDed. An analog OR gate selects the greater of its input signals and an analog AND gate selects the lesser of its inputs. The ramp combiner allows for a continuous and smooth clock wipe, again with a minimum of circuit complexity.

The output from the ramp combiner is sent to an output signal generator where video control signals are produced in response to the output of the ramp combiner. The video control signals are in turn sent to a video mixer. Using the video control signals, an output video signal is produced from two input video signals.

Various of the above-mentioned and further features and advantages will be apparent from the specific examples described hereinbelow of an exemplary apparatus and method.

BRIEF DESCRIPTION OF THE DRAWINGS

FIG. 1 is a schematic representation of circuitry for generating signals for producing a wipe in accordance with this invention.

FIG. 2 is a schematic representation of a ramp combiner circuit of the present invention.

FIG. 3 is a schematic representation illustrating the combining of video signals in a clock wipe in accordance with this invention.

FIG. 4 is a table showing the various waveform signals and input and output video pictures for the circuits of FIGS. 1–3.

DETAILED DESCRIPTION

Referring now to FIG. 1, from a control panel of a video switcher, the operator provides information as to the start angle of the wipe and the speed and motion the wipe is to use. This information is provided to a controller 10 which, in turn, supplies a control signal 50, further described below in FIG. 2. Controller 10 can take many forms, but the preferred method of implementation is to use a commercially available microprocessor such as Motorola 68000 microprocessor.

A sync signal 20, related to all the video signals involved with the video switcher, is fed into a horizontal ramp generator 12, and a vertical ramp generator 14.

This sync signal 20 can be produced by the switcher itself or by a sync generator for an entire video system. Using sync signal 20 as a timing reference, both generators produce a voltage ramp.

Video signals have both a horizontal and vertical scanning period. The horizontal ramp 16 has a period of the horizontal video rate, such as 63.5 microseconds for the NTSC television standard. The vertical ramp 18 has a period of the vertical video rate, which is 16.6 milliseconds for the NTSC television standard. This relationship relates to the time required to complete one horizontal video scan as compared to the time it takes to complete one vertical video scan. Ramp generators 12 and 14 are of common design as can be easily constructed by one skilled in the art or can be purchased as a readily available integrated circuit package.

The output from the horizontal ramp generator 12, the horizontal ramp control signal, is fed to analog amplifiers 28 and 32. The output from the vertical ramp generator 14, the vertical ramp control signal, is fed to analog amplifiers 30 and 34. The purpose of analog amplifiers 28, 30, 32 and 34 is to adjust the control waveform, for the well known 3 to 4 aspect ratio of a video picture. These analog amplifiers are under control of controller 10. Analog amplifiers 28 and 34 adjust the waveform by plus or minus 1, controlled by controller 10. Analog amplifier 30 adjusts the waveform by plus or minus ¾, controlled by controller 10. Analog amplifier 32 adjusts the waveform by plus or minus 4/3, controlled by controller 10. These adjustments are made to conform the control signals to the 3 to 4 aspect ration of the rectangular area that is defined to be the video signal displayed on a monitor. The output amplifiers 28, 30, 32 and 34 are coupled to multiplying digital to analog converters 36, 38, 40 and 42, respectively.

When a video signal is displayed on a monitor, the picture is made up of horizontal raster scans across the screen. A point of reference for the wipe is a reference line that starts in the center of the screen and extends vertically upward at an angle of 90° to the raster scan. This reference line is used for determining a start angle, or ray, and a current rotation angle. It should be noted that any reference line could be used.

Operator control line 22 provides information to controller 10 about the desired start angle and current rotation angle, in relation to the reference ray. The controller internally produces a start angle and a current rotation angle. During a wipe the start angle will remain constant, while the current rotation angle will change depending on the information from the operator control. The start angle is used to determine where on the screen the clock wipe will begin and end. The current rotation angle determines where the transition boundary is currently positioned on the screen.

Controller 10 calculates both the sine and the cosine of both the start angles and the current rotation angle. The results of these calculations comprise the rotation control data which is sent to multiplying digital to analog converters 36, 38, 40, and 42. These multipliers use the digital data to multiply the analog signal to form an output analog signal. The rotation control data is sent in digital format to the multiplying digital to analog converters. The effect of multiplying digital to analog converters is to rotate the horizontal and vertical control ramp signals. Analog multiplier 36 multiplies the cosine of the current rotation angle with the horizontal control ramp signal, while analog amplifier 38 multiplies the sine of the current rotation angle with the vertical ramp signal. Analog multiplier 40 multiplies the sine of the start angle with the horizontal control ramp signal, while analog amplifier 42 multiplies the cosine of the start angle with the vertical control ramp signal. Analog multipliers of this type are commonly available in standard integrated circuit packages, and are easily implemented by one skilled in the art.

The output of multiplying digital to analog converters 36 and 38 are fed to analog summer 46 to produce a rotation waveform control signal, referred to as X signal 52. Similarly, the output of multiplying digital to analog converters 40 and 42 re fed to analog summer 48 to produce a start angle waveform control signal, referred to as Y signal 54. The X or Y signals, if fed to the output signal generator 72 (FIG. 3) would produce on the output video picture, a line of transition from one side of the screen to the other, passing through the center of the screen. It is the combination of the X and Y signals that generates the rotating clock wipes.

Referring to FIG. 2, there are three input signals to this circuit, the X and Y signals 52 and 54, and the control signal 50 from the controller. X signal 52 is fed into one of the inputs of an analog AND gate 60. The Y signal is fed into a switch 66. Switch 66 can be selected to output Y signal 54 to analog AND gate 60 or to an analog AND gate 62. The switch 66 is controlled by controller 10 (FIG. 1) through control line 50 (FIGS. 1 and 2). The second input to analog AND gate 62 is disabled by being connected to a positive voltage, such that whatever is applied to the first input is passed to the output. The purpose of this gate is to match signal paths when the X signal is being passed through analog AND gate 60. The outputs of analog AND gates 60 and 62 are fed into analog OR gate 64 to produce the desired rotating clock wipe waveform control signal 68.

analog OR gate 64 selects the greater of its input signals, and the analog AND gates 60, 62 select the lesser of their inputs. Analog gates 60, 62, and 64 are common in the art and can be designed in a variety of manners by a person skilled in the art.

The operation of the ramp combiner is to OR the X and Y signals when the difference between the start angle and the current rotation angle is less than 180°, and to AND the signals when the difference is greater than 180°. The purpose of this combining will be apparent in the discussion of FIG. 3.

The required ANDing and ORing is accomplished by the following analog gating. The X signal is fed into one of the inputs of analog AND gate 60. When the difference between the start angle and the current rotation angle is less than 180°, switch 66 is in a position such that the Y signal is fed into one of the inputs of analog AND gate 62. The other input of analog AND gate 60 is pulled positive and disabled when the switch is in this position. With only one active input on analog AND gates 60 and 62, there is no effect on the X and Y signals at their outputs. As mentioned, the sole purpose of analog AND gate 62 is to provide common signal processing when switch 66 is in this first position. Because of the biasing on the signal when it passes through an analog gate, it is very important that signals that are to be combined, are commonly processed. A lack of common processing leads to picture degradation and distortion. The outputs of both analog AND gates 60 and 62 are fed into the inputs of analog OR gate 64 and are ORed. This output is the rotating clock wipe waveform control signal 68.

When the difference between the start angle and the current rotation angle is greater than 180°, the switch 66 is in the second position where the Y signal fed into the second input of analog gate 60. As before, the first input to analog AND gate 60 is the X signal. With both the X and Y signals as inputs, analog AND gate AND's the two signals to form an output signal. There is not active input to analog AND gate 62, thus it produces no signal. The output of analog AND gate 60 is inputted to analog OR gate 64. Because of the lack of signal from gate 62, gate 64 simply outputs the original output from analog AND gate 60. This signal now is the rotating clock wipe waveform control signal 68.

Referring to FIG. 3, the waveform control signal 68 is fed into output signal generator 72. Operator control signal 73 is also fed into output signal generator 72. The operator control signal originates at the control panel of the switches and is used to determine whether there is a color border between the two pictures at the line of transition, and whether the line of transition between the two pictures is a hard line or soft line. Output signal generator 72 receives waveform control signal 68 and produces three mixer control signals, A and B video mixer control signals, 74 and 76, and a border mixer control signal 78. These three signals are in turn fed to video mixer 84. Two video signals, A input video signal and B input video signal, 80 and 82, are also inputted to the video mixer. Using the three mixer control signals, 74, 76, and 78, the A and B input video signals, 80 and 82, are mixed to produce an output video signal 86 which is suitable for use on any standard video signal utilization device, such as a video tape recorder, a monitor, or a video broadcast system.

Output signal generator 72 is of a common design and can be routinely constructed by a person skilled in the art. The three mixer control signals, 74, 76, and 78, are of a common type and adaptable to work with any standard video mixer by a person skilled in the art. Video mixers, such as video mixer 84, are also common in the art.

FIG. 4 is a tabular representation of the input and output signals for the example where the start angle is 0° from the reference ray. For a start angle of 0°, if the Y signal were sent the output processor alone, it would produce the screen shown. The screen, labeled Y wipe, is what would be seen if output video signal 86 were displayed on a monitor. The line down the center of the screen is the line of transition between A video signal 80 and B video signal 82. The blank half of the screen is from the B video and the cross-hatched portion is from the A video. If the start angle were something other than 0°, the line of transition would be from the start angle to the vertical reference ray. As described above, the start angle controls the Y signal which is used to set the start transition line while the current rotation angle is rotated from 0° to 360° relative to the start transition line. It is clear that the channels can be reversed and X could be used to set the start angle and the Y signal could be rotated, if desired.

The columns on the table in FIG. 4 are labeled as follows. The current rotation angle is represented in the first column on the left. Representative angles are shown from 0° to 360° in increments of 45°. The next two columns from the right are labeled Hcos and Vsin. The column labeled Hcos represents the horizontal control ramp 16 after it has been multiplied by the cosine of the current rotation angle in analog multiplier 36. The column labeled Vsin represents the vertical control ramp 18 after it has been multiplied by the sine of the current rotation angle in analog multiplier 38.

The next column, labeled X wipe represents what a monitor would show if the X signal were fed to the output signal generator 72 alone and an output video signal of that were displayed on a monitor. The blank half of the screen represents the B input video picture and the cross-hatched portion represents the A input video picture. As the current rotation angle changes from 0° to 360°, the line of transition between the A input video picture and the B input video picture rotates around the center point of the screen, covering and un-covering portions of input video pictures A and B, and forms the output video picture.

The column labeled switch function shows the switch function used at different points through the wipe. It should be noted that switch 66 selects the X OR Y function when the angle between the start ray and current line of transition is less than 180°. The switch selects the X AND Y function when the angle between the start ray and the current line of transition is between 180° and 360°.

The last column represents what would be viewed on a monitor screen of the wipe obtained using the output control signal fed into the output signal generator 72. In these figures the cross-hatched region with the cross-hatching sloping down to the right is A input video picture enabled by the Y signal. The cross-hatched area with the cross-hatches sloping down to the left is the A input video picture enabled by the X signal. The area in these screens where both cross-hatching is used, represents the area where both X and Y signals enable the A video signal. To the viewer of the wipe, all three cross-hatched areas appear as the A video signal. The viewer is only aware of the lines of transition between the two signals, that is, between the blank and cross-hatched areas.

At 0° the output wipe column shows that X and Y waveforms are ORed such that only the A input video picture is visible. This would be the normal situation before the wipe is started. This is where the start angle and the current rotation angle are the same. At 45°, the Y waveform remains in the same place as it does all through the wipe, and the X waveform has rotated 45°. Because the X and Y signals are ORed, only the area that is blank shows the B input video picture. The process is the same until the current rotation angle reaches 180° from the start angle. At this point, the switch selects the X AND Y function and the X and Y signals are ANDed. This means that the A input video picture that is covered by both cross hatched areas, as shown in the output pictures from 180° to 360°.

While the embodiments disclosed herein are preferred, it will be appreciated that they are merely examples, and that various alternatives, modifications, variations or improvements thereon may be made by those skilled in the art from this teaching, which are intended to be encompassed by the following claims.

What is claimed is:

1. Apparatus for producing a rotating clock video wipe waveform control signal, from a ray having a positional relationship to a raster, said positional relationship defining a start angle and a current rotation angle, comprising:
   ramp generating means for producing a horizontal control ramp signal at a horizontal video rate and a vertical control ramp signal at a vertical video rate;

control means responsive to said start angle and said current rotation angle for generating rotation control data and a logic control signal;

ramp rotation means responsive to said horizontal and vertical ramp signals and said rotation control data for producing a start angle waveform control signal and a rotation waveform control signal; and logic means responsive to said start angle waveform control signal and said rotation waveform control signal and said logic control signal for combining said start angle waveform control signal and said rotation waveform control signal in a first manner when a difference between said current rotation angle and said start angle is less than a transitional angle and in a second manner when said difference is greater than said transitional angle to produce said rotating wipe waveform control signal.

2. The apparatus of claim 1 wherein said control means comprises a microprocessor.

3. The apparatus of claim 1 wherein said transitional angle is 180°.

4. The apparatus of claim 1 wherein said first manner of combining said start angle waveform control signal and said rotation waveform control signal is by analog ORing.

5. The apparatus of claim 1 wherein said second manner of combining said start angle waveform control signal and said rotation waveform control signal is by analog ANDing.

6. The apparatus of claim 1 wherein said logic means comprises:

analog switch means responsive to said start angle waveform control signal and said logic control signal for switching said start angle waveform control signal between a first output and a second output;

analog AND gate means responsive to said rotation waveform control signal and said first output of said analog switch for ANDing said start angle waveform control signal and said first output from said analog switch to produce a AND gate output signal;

connection means responsive to said first output of said analog switch for producing a connection means output signal; and analog OR gate means responsive to said AND gate output signal and said connection means signal for analog ORing said AND gate output signal and said connection means signal to produce said rotating clock wipe waveform control signal.

7. The apparatus of claim 6 wherein said connection means comprises a matching analog AND gate.

8. The apparatus of claim 1 wherein said ramp rotation means comprises:

rotation waveform ramp rotation means responsive to said horizontal and vertical ramp signals and said rotation control data for producing said rotation waveform control signal; and start angle waveform ramp rotation means responsive to said horizontal and vertical ramp signals and said rotation control data for producing said start angle waveform control signal.

9. The apparatus of claim 8 wherein said rotation waveform ramp rotation means comprises:

a first multiplying digital to analog converting means responsive to said horizontal ramp signal and said rotation control data for producing a rotated horizontal ramp signal;

a second multiplying digital to analog converting means responsive to said vertical ramp signal and said rotation control data for producing a rotated vertical ramp signal; and an analog summing means responsive to said rotated horizontal ramp signal and said rotated vertical ramp signal for producing said rotation waveform control signal.

10. The apparatus of claim 9 wherein a controller produces said rotation control data such that the rotation control data supplied to said first multiplying digital to analog converting means is the cosine of the current rotation angle and the rotation control data supplied to said second multiplying digital to analog converting means is the sine of the current rotation angle.

11. The apparatus of claim 8 wherein said start angle waveform ramp rotation means comprises:

a first multiplying digital to analog converting means responsive to said horizontal ramp signal and said rotation control data for producing a rotated horizontal ramp signal;

a second multiplying digital to analog converting means responsive to said vertical ramp signal and said rotation control data for producing a rotated vertical ramp signal; and a analog summing means responsive to said rotated horizontal ramp signal and said rotated vertical ramp signal for producing said start angle waveform control signal.

12. The apparatus of claim 11 wherein a controller produces said rotation control data such that the rotation control data supplied to said first multiplying digital to analog converting means is the sine of the start angle and the rotation control data supplied to said second multiplying digital to analog converting means is the cosine of the start angle.

13. Apparatus for producing a rotating clock video wipe, from a ray having a positional relationship to a raster, said positional relationship defining a start angle and a current rotation angle, comprising:

ramp generating means for producing a horizontal control ramp signal at a horizontal video rate and a vertical control ramp signal at a vertical video rate;

control means responsive to said start angle and said current rotation angle for generating rotation control data and a logic control signal;

ramp rotation means responsive to said horizontal and vertical ramp signal and said rotation control data for producing a start angle waveform control signal and a rotation waveform control signal;

logic means responsive to said start angle waveform control signal and said rotation waveform control signal and said logic control signal for combining said start angle waveform control signal and said rotation waveform control signal in a first manner when a difference between said current rotation angle and said start angle is less than a transitional angle and in a second manner when said difference is greater than said transitional angle to produce a rotating wipe waveform control signal; and video output means responsive to said rotating wipe waveform control signal for producing an output video signal from at least two input video signals.

14. The apparatus of claim 13 wherein said control means comprises a microprocessor.

15. The apparatus of claim 13 wherein said video output means comprises:

output signal generating means responsive to said rotating wipe waveform control signal for producing at least two video control signals; and video mixing means responsive to said video control signals for producing an output video signal from at least two input video signals.

16. The apparatus of claim 13 wherein said transitional angle is 180°.

17. The apparatus of claim 13 wherein said first manner of combining said start angle waveform control signal and said rotation waveform control signal is by analog ORing.

18. The apparatus of claim 13 wherein said second manner of combining said start angle waveform control signal and said rotation waveform control signal is by analog ANDing.

19. The apparatus of claim 13 wherein said logic means comprises:

analog switch means responsive to said start angle waveform control signal and said logic control signal switching said start angle waveform control signal between a first output and a second output;

analog AND gate means responsive to said rotation waveform control signal and said first output of said analog switch for ANDing said start angle waveform control signal and said first output from said analog switch to produce a AND gate output signal;

connection means responsive to said first output of said analog switch for producing a connection means output signal; and analog OR gate means responsive to said AND gate output signal and said connection means signal for analog ORing said AND gate output signal and said connection means signal to produce said rotating clock wipe waveform control signal.

20. The apparatus of claim 19 wherein said connection means comprises a matching analog AND gate.

21. The apparatus of claim 13 wherein said ramp rotation means comprises:

rotation waveform ramp rotation means responsive to said horizontal and vertical ramp signals and said rotation control data for producing said rotation waveform control signal; and start angle waveform ramp rotation means responsive to said horizontal and vertical ramp signals and said rotation control data for producing said start angle waveform control signal.

22. The apparatus of claim 21 wherein said rotation waveform ramp rotation means comprises:

a first multiplying digital to analog converting means responsive to said horizontal ramp signal and said rotation control data for producing a rotated horizontal ramp signal;

a second multiplying digital to analog converting means responsive to said vertical ramp signal and said rotation control data for producing a rotated vertical ramp signal; and a analog summing means responsive to said rotated horizontal ramp signal and said rotated vertical ramp signal for producing said rotation waveform control signal.

23. The apparatus of claim 22 wherein a controller produces said rotation control data such that the rotation control data supplied to said first multiplying digital to analog converting means is the cosine of the current rotation angle and the rotation control data supplied to said second multiplying digital to analog converting means is the sine of the current rotation angle.

24. The apparatus of claim 21 wherein said start angle waveform ramp rotation means comprises:

a first multiplying digital to analog converting means responsive to said horizontal ramp signal and said rotation control data for producing a rotated horizontal ramp signal;

a second multiplying digital to analog converting means responsive to said vertical ramp signal and said rotation control data for producing a rotated vertical ramp signal; and a analog summing means responsive to said rotated horizontal ramp signal and said rotated vertical ramp signal for producing said start angle waveform control signal.

25. The apparatus of claim 24 wherein a controller produces said rotation control data such that the rotation control data supplied to said first multiplying digital to analog converting means is the sine of the start angle and the rotation control data supplied to said second multiplying digital to analog converting means is the cosine of the start angle.

26. Method for producing a rotating clock wipe video, from a ray having a positional relationship to a raster, said positional relationship defining a start angle and a current rotation angle, comprising the ordered steps of:

generating a horizontal control ramp signal at a horizontal video rate and a vertical control ramp signal at a vertical video rate;

generating rotation control data and a logic control signal from the start angle and the current rotation angle;

rotating said horizontal and vertical ramp signals in response to said rotation control data to produce a start angle waveform control signal and a rotation waveform control signal;

combining said start angle waveform control signal and said rotation waveform control signal, in response to said logic control signal in a first manner when a difference between said current rotation angle and said start angle is less than a transitional angle and in a second manner when said difference is greater than said transitional angle to produce a rotating wipe waveform control signal; and mixing at least two input video signals in response to said rotating wipe waveform control signal to produce an output video signal.

27. The method of claim 26 wherein said step of mixing further comprises the steps of:

generating at least two video control signals from said rotating wipe waveform control signal; and mixing at least two input signals in response to said video control signals to produce an output video signal.

28. The method of claim 26 wherein said first manner of combining said start angle waveform control signal and said rotation waveform control signal is by analog ORing.

29. The method of claim 26 wherein said second manner of combining said start angle waveform control signal and said rotation waveform control signal is by analog ANDing.

30. The method of claim 26 wherein said combining step further comprises the ordered steps of:

analog switching said start angle waveform control signal between a first output and a second output in response to said logic control signal;

analog ANDing said start angle waveform control signal and said first output from said analog switch in response to said rotation waveform control signal and said first output of said analog switch to produce a AND gate output signal;

connecting said first output of said analog switch to produce a connection output signal; and analog ORing said AND gate output signal and said connection means signal to produce said rotating clock wipe waveform control signal.

31. The method of claim 30 wherein said connecting step further comprises analog ANDing said first output of said analog switch with a high signal to match signal paths.

32. The method of claim 26 wherein said step of rotating said horizontal and vertical ramp signals further comprises the steps of:

rotating said horizontal and vertical ramp signals in response to said rotation control data to produce said rotation waveform control signal; and rotating said horizontal and vertical ramp signals in response to said rotation control data to produce said start angle waveform control signal.

33. The method of claim 32 wherein the step of rotating said horizontal and vertical ramp signals in response to said rotation control data to produce said rotation waveform control signal, further comprises the steps of:

multiplying said horizontal ramp signal and said rotation control data to produce a rotated horizontal ramp signal;

multiplying said vertical ramp signal and said rotation control data to produce a rotated vertical ramp signal; and summing said rotated horizontal ramp signal and said rotated vertical ramp signal to produce said rotation waveform control signal.

34. The method of claim 33 wherein the step of multiplying said horizontal ramp signal and said rotation control data to produce a rotated horizontal ramp signal, said horizontal ramp signal is multiplied by the cosine of the current rotation angle.

35. The method of claim 33 wherein the step of multiplying said vertical ramp signal and said rotation control data to produce a rotated vertical ramp signal, said vertical ramp signal is multiplied by the sine of the current rotation angle.

36. The method of claim 32 wherein the step of rotating said horizontal and vertical ramp signals in response to said rotation control data to produce said start angle waveform control signal, further comprises the steps of:

multiplying said horizontal ramp signal and said rotation control data to produce a rotated horizontal ramp signal;

multiplying said vertical ramp signal and said rotation control data to produce a rotated vertical ramp signal; and summing said rotated horizontal ramp signal and said rotated vertical ramp signal to produce said start angle waveform control signal.

37. The method of claim 36 wherein the step of multiplying said horizontal ramp signal and said rotation control data to produce a rotated horizontal ramp signal, said horizontal ramp signal is multiplied by the sine of the start angle.

38. The method of claim 36 wherein the step of multiplying said vertical ramp signal and said rotation control data to produce a rotated vertical ramp signal, said vertical ramp signal is multiplied by the cosine of the start angle.

39. Apparatus for switching between a first video signal and a second video signal, comprising:

control means for generating rotation control data in response to transition boundary progression data supplied by an operator;

rotatable ramp generating means for producing at least two rotatable control ramps in response to said rotation control data;

ramp combining means for producing a video mixer control signal in response to said rotatable control ramps; and video mixing means switching between said first video signal and said second video signal according to said video mixer control signal so as to produce an output video signal defining a rotating clock wipe.

40. The apparatus of claim 39 wherein said rotatable ramp generating means further comprises:

ramp generating means for producing a horizontal control ramp signal at a horizontal video rate and a vertical control ramp signal at a vertical video rate;

ramp rotation means responsive to said horizontal and vertical ramp signals and said rotation control data for producing said rotatable control ramps.

41. The apparatus of claim 40 wherein said ramp combining means further comprises logic means responsive to said rotation control data for combining said rotatable control ramps in a first manner when a difference in angle between said control ramps is less than a transitional angle and in a second manner when said difference is greater than said transitional angle.

* * * * *